US011316929B2

United States Patent
Lv et al.

(10) Patent No.: US 11,316,929 B2
(45) Date of Patent: Apr. 26, 2022

(54) VIRTUALIZED REMOTE WORKING PLACE

(71) Applicant: VMware, Inc., Palo Alto, CA (US)

(72) Inventors: Lin Lv, Beijing (CN); Chaoting Xuan, Atlanta, GA (US); Tong Zhao, Beijing (CN); Bo Steven Liu, Beijing (CN); Yue Zhao, Beijing (CN); Yanchao Zhang, Beijing (CN); Qimin Yao, Atlanta, GA (US); Suyu Pan, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/504,741

(22) Filed: Jul. 8, 2019

(65) Prior Publication Data

US 2021/0014317 A1   Jan. 14, 2021

(51) Int. Cl.
  H04L 29/08     (2006.01)
  H04L 67/141    (2022.01)
  H04L 67/563    (2022.01)
  H04L 67/08     (2022.01)
  H04L 67/025    (2022.01)
  H04L 67/75     (2022.01)

(52) U.S. Cl.
  CPC .......... H04L 67/141 (2013.01); H04L 67/025 (2013.01); H04L 67/08 (2013.01); H04L 67/2814 (2013.01); H04L 67/36 (2013.01)

(58) Field of Classification Search
  CPC ..... G06F 2209/549; G06F 9/452; G06F 3/048
  See application file for complete search history.

(56) References Cited

U.S. PATENT DOCUMENTS

| | | | | |
|---|---|---|---|---|
| 2007/0239859 A1* | 10/2007 | Wilkinson | .............. | H04L 63/08 709/220 |
| 2011/0209064 A1* | 8/2011 | Jorgensen | ............... | G06F 9/452 715/733 |
| 2012/0096365 A1* | 4/2012 | Wilkinson | .............. | G06F 9/468 715/740 |
| 2014/0082533 A1* | 3/2014 | Kelley | .................. | G06F 3/0488 715/764 |
| 2016/0028811 A1* | 1/2016 | Rashid | ................ | H04L 67/1095 715/738 |
| 2017/0316363 A1* | 11/2017 | Siciliano | ................ | G06Q 10/10 |

(Continued)

*Primary Examiner* — Oleg Survillo
*Assistant Examiner* — Christopher P Cadorna
(74) *Attorney, Agent, or Firm* — Patterson & Sheridan, LLP (57) ABSTRACT

Embodiments of the present disclosure relate to management of resources. Embodiments include receiving, from a user of a client device, first input indicating a location on a remote device and a file type. Embodiments include identifying a file corresponding to the file type at the location. Embodiments include generating a graphical representation of the file and providing the graphical representation of the file to the user. Embodiments include receiving, from the user, second input corresponding to the graphical representation of the file. Embodiments include identifying stored credentials based on the second input and initiating a virtual desktop session using the stored credentials. Embodiments include providing a remote interface to the virtual desktop session on the client device. Embodiments include launching an application within the virtual desktop session and opening the file within the application.

21 Claims, 7 Drawing Sheets

(56) References Cited

U.S. PATENT DOCUMENTS

2017/0364235 A1* 12/2017 Venkatesh ........... H04L 67/1095
2019/0132381 A1*  5/2019 Momchilov .............. G06F 9/54
2019/0213101 A1*  7/2019 Raviv ....................... G06F 8/33

* cited by examiner

VIRTUALIZED REMOTE WORKING PLACE

BACKGROUND

Computing resources are increasingly distributed across different computing systems. For example, a given user using a client device generally accesses a variety of different resources such as files, applications, desktops, services, etc., on different computing systems (e.g., computing devices, cloud computing systems, cloud storage systems, network storage systems, virtual computing instances such as virtual machines, etc.).

Certain applications allow users to access resources maintained at different computing systems from a client device, such as over a network. In some cases, a user uses a client application to access data stored on a remote desktop executing on a remote computing system. However, where resources are spread across multiple different computing systems, it can become inconvenient and inefficient for a user to frequently connect to different computing systems to access and interact with content. For example, the steps required for a client device to manually connect to a remote desktop and access particular files and applications or transfer files to and from the remote desktop to the client device can be time-consuming. In particular, using remote resources of remote computing systems together to perform complex workflow tasks can be challenging or impossible using existing techniques.

Accordingly, there is a need in the art for improved techniques of enabling users to manage and access remote resources.

SUMMARY

Herein described are one or more embodiments of a method. The method generally includes: receiving, from a user of a client device, first input indicating: a location on a remote device; and a file type; identifying a file corresponding to the file type at the location; generating a graphical representation of the file; providing the graphical representation of the file to the user; receiving, from the user, second input corresponding to the graphical representation of the file; identifying stored credentials based on the second input; initiating a virtual desktop session using the stored credentials; providing a remote interface to the virtual desktop session on the client device; launching an application within the virtual desktop session; and opening the file within the application.

Also described herein are embodiments of a computer system, wherein software for the computer system is programmed to execute the method described above.

Also described herein are embodiments of a non-transitory computer readable medium comprising instructions to be executed in a computer system, wherein the instructions when executed in the computer system perform the method described above.

DETAILED DESCRIPTION

Embodiments presented herein relate to techniques for enabling efficient management of resources. In certain embodiments, a centralized workspace is provided to a user via a client device for accessing and managing resources.

In certain examples, a user maintains resources on a variety of different computing systems. Techniques described herein allow the user to quickly access and interact with these resources from a single workspace accessible via a client device regardless of whether they are located remotely with respect to the client device. In one example, the user provides input to the workspace via the client device identifying resources for inclusion in the workspace, such as by identifying a remote location and one or more resource types, such as file types. Based on the input, a workspace engine identifies all resources of the one or more resource types at the remote location and displays a graphical indication (e.g., an icon) for each identified resource on a homepage of the workspace. The user is then enabled to access and interact with the resources through the workspace via the graphical representations.

For example, the user may open a file stored on a remote computing system, such as a file located on a virtual desktop, by clicking on an icon corresponding to the file displayed in the workspace. The workspace engine automatically accesses the file on the remote computing system, such as by using credentials provided in advance by the user (e.g., as part of a configuration process) to launch the remote computing system and opening the file in the remote computing system so that the user can view and/or edit the file. As such, the user is able to efficiently access a file within a remote computing system without going through a series of inconvenient steps.

In certain embodiments, the user defines applications for use with particular file types or selects an application with which to open a given file. In other embodiments, the workspace engine determines an application with which to open a given file based on historical data indicating applications with which one or more users have historically opened files of a type of the given file. The application may, for instance, run on a remote computing system, and may be launched within the remote computing system to open the file. Once the file is opened, the user can view, modify, and otherwise interact with the file as if it were stored locally. As such, even if the file is stored remotely, such as on a virtual desktop, the user can efficiently access the file from the workspace without manually logging into the virtual desktop.

Other than opening files, the workspace also provides additional functionality with respect to resources. For example, users can copy resources between locations, remove resources, share resources (e.g., between users and/or applications), print resources, define and access workflows involving resources, and collaborate with other users with resources. In certain embodiments, each of these operations is supported by the workspace engine, which can automatically connect to remote locations (virtual desktops) as needed, such as using stored credentials provided by the user. In some embodiments a pop-up menu is displayed in the workspace when the user selects a graphical representation of a resource, such as when the user clicks on a corner of the graphical representation. The pop-up menu includes a number of operations that the user can select with respect to the resource. As such, the user is enabled to efficiently perform a variety of different operations using a variety of remote resources from a centralized workspace without having to perform time-consuming processes to access the resources (e.g., manually logging on to a remote desktop, navigating to a remote file location, and/or the like).

In certain embodiments, the workspace allows a user to open a file stored in one location using an application running in a different location. In an example, the user selects a graphical representation of a file stored at a remote location, such as a cloud storage drive, and then selects an option provided by the workspace to open the file using an application running on a virtual desktop that is different than the remote location at which the file is stored. The workspace automatically launches the virtual desktop, launches the application, and opens the file within the application without the user having to separately copy the file to the virtual desktop. In some cases, changes made to the file within the virtual desktop are tracked and persisted back to the remote location at which the file is stored by components associated with the workspace.

Figure 1:
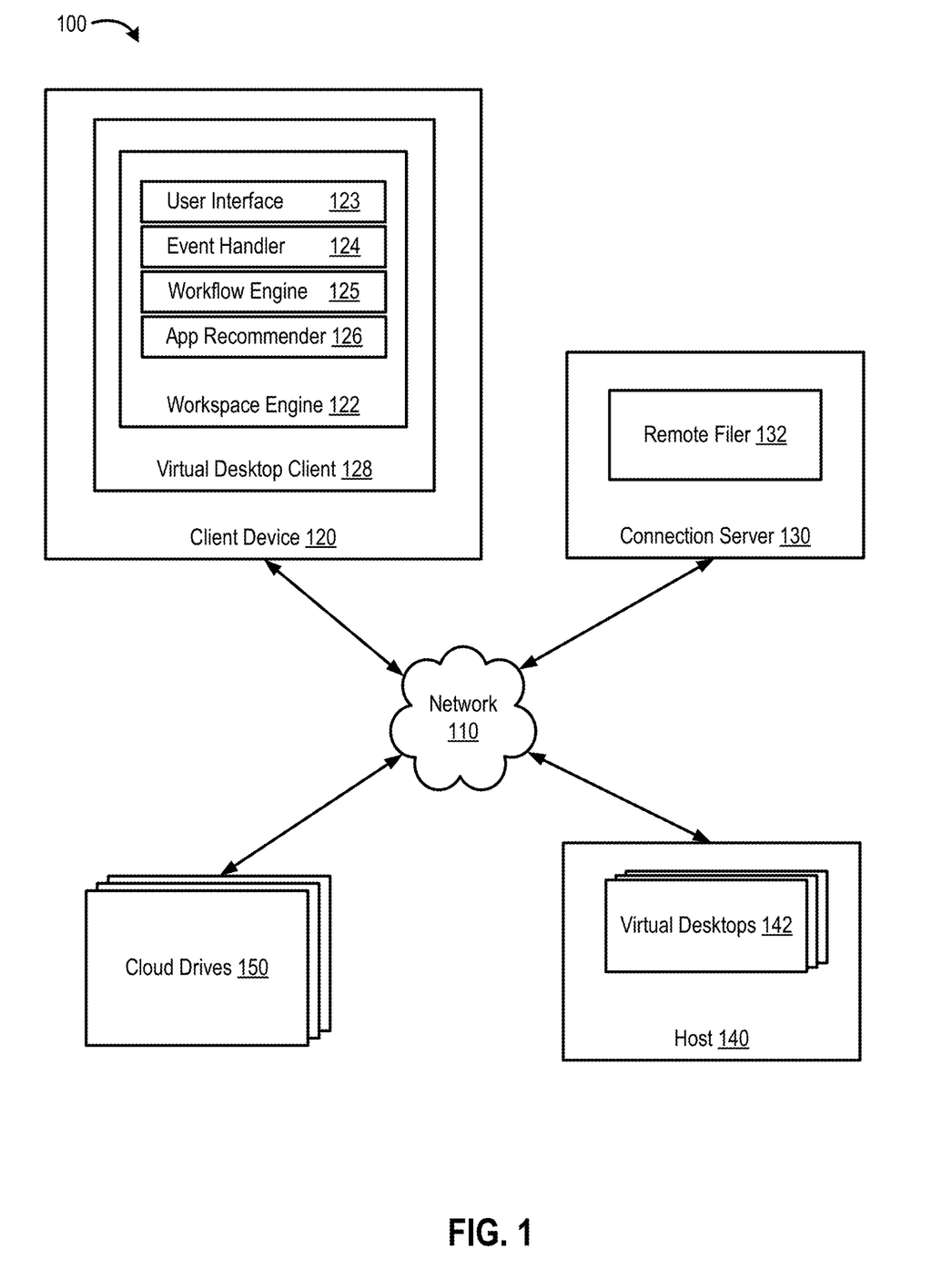
FIG. 1 illustrates components of an example computing environment in which embodiments may be implemented.

FIG. 1 illustrates components of a computing environment 100 in which embodiments of the present disclosure may be implemented. As shown, computing environment 100 includes a client device 120, a connection server 130, a host 140, and, in certain embodiments, a plurality of cloud drives 150, connected via network 110. Network 110 can, for example, be a local area network (LAN), wide area network (WAN), cellular data network, the Internet, or any connection over which data can be transmitted.

Client device 120 generally represents a computing device such as a desktop computer, laptop computer, mobile device, wearable device, or the like. Client device 120 comprises virtual desktop client 128, which generally performs operations related to interacting with a virtual desktop, such as a virtual desktop 142 on host 140. For example, virtual desktop client 128 comprises an interface (e.g., a virtual desktop software application) through which client device 120 provisions, manages, and accesses virtual desktops, such as a virtual desktop 142 on host 140.

A virtual desktop generally refers to a desktop or other application of a virtual machine (VM) that is accessed from a virtual desktop client. With virtual desktop functionality, users can access desktops or applications running in a remote data center (e.g., host 140) through network 110, from any location, using a general purpose computer running a commodity operating system and a virtual desktop client software program, such as virtual desktop client 128 on client device 120. Virtual machines are described in more detail below with respect to FIG. 2.

Virtual desktop client 128 comprises workspace engine 122, which generally performs operations described herein for allowing a user to efficiently manage resources. In certain embodiments, remote resources are accessible via network 110, such as in remote desktops or cloud storage. Workspace engine 122 includes a user interface 123 that presents a workspace to a user of client device 120, such as via a display associated with client device 120, and through which the user provides input to workspace engine 122. The workspace generally comprises a portal through which the user accesses and manages remote resources. In one example, the user configures the workspace through interactions with user interface 123. The user, for instance, provides input to user interface 123 identifying resources for inclusion in the workspace. For example, the user can provide a location (e.g., a network path) and one or more resource types, such as file types, and workspace engine 122 identifies all resources of the resource types at the location for inclusion in the workspace. In some embodiments, workspace engine 122 generates a graphical representation of each resource, such as an icon with accompanying text (e.g., a file name of the resource) and includes the graphical representation in the workspace for display via user interface 123. In some embodiments, the user provides drag-and-drop input via user interface 123, such as by dragging a resource from a remote folder onto the workspace, and workspace engine 122 adds a graphical representation of the resource to the workspace for display via user interface 123

User interface 123 generally displays the workspace, including graphical representations of resources. User interface 123 also provides the user with options with respect to the resources. For example, the user selects a resource by clicking on a corner of a graphical representation of the resource within the workspace, and a pop-up menu is displayed within user interface 123 that presents the user with a plurality of options. The options include, for instance, opening, removing, copying, printing, collaborating, sharing, defining a workflow, selecting a protocol with which to display a resource, and/or other options. If the user selects to, for example, open the resource, then the resource is opened within user interface 123, such as using a default application or an application identified by the user. If the resource is an application, then the application can be launched within user interface 123. If the resource is a virtual desktop, then workspace engine 122 automatically connects to the virtual desktop, in some embodiments using stored credentials, and launches the virtual desktop within the workspace. In certain embodiments, the user provides one or more parameters for displaying a resource, such as a window size, whether to open the resource in full screen mode, a protocol with which to display the resource, and/or the like. Workspace engine 122 then displays the resource within user interface 123 according to the parameters specified by the user.

Workspace engine 122 further comprises event handler 124, which generally performs operations related to handling events that occur within the workspace. For instance, when a user provides input indicating that a virtual desktop should be opened in the workspace, event handler 124 handles the input as an event, such as by providing a uniform resource identifier (URI) request to virtual desktop client 128 to launch the virtual desktop based on the input. If the user drags and drops a local file onto a graphical representation of a virtual desktop on the workspace via user interface 123, event handler 124 handles the input as an event, such as by providing a path of the local file to virtual desktop client 128, and virtual desktop client 128 establishes a connection with the virtual desktop (e.g., a virtual desktop 142) and copy the local file from the path to the virtual desktop. In some embodiments, the copied file information (e.g., the new path of the file on the virtual desktop 128), is provided from the virtual desktop 142 to remote filer 132, which then provides the copied file information to workspace engine 122. Workspace engine 122 then re-renders the workspace in user interface 123 to display a graphical representation of the file with the copied file information.

Workspace engine 122 further comprises workflow engine 125, which generally performs operations related to designing, managing, and executing workflows involving resources. For example, a user defines a workflow by providing input to user interface 123 identifying one or more resources and one or more steps in the workflow, or the steps of the workflow are predefined, such as by an administrator via a workflow template. In one example, a workflow involves an approval process for a document, such as a series of users that will review a document before it is approved. When a workflow is initiated by a user, workflow engine 125 automatically advances through the steps of the workflow, such as by sending the document to different users for review and awaiting approval from a given user before advancing to the next step. In certain embodiments, workflow engine 125 notifies one or more users, such as all users involved in the workflow, when each step of the workflow has been completed. A workflow can end, for example, when all designated reviewers have approved a document. If a reviewer suggests revisions or leaves other comments, then the document may need to be revised (e.g., the initiating user may accept the revisions and/or make additional revisions based on the reviewing user's feedback) and approved by the reviewer following revisions before the workflow ends.

Workspace engine 122 further comprises app recommender 126, which generally performs operations related to recommending applications for use in accessing resources. For example, app recommender 126 stores associations between applications and resource types, such as file types, such as based on user history, user preferences, predetermined defaults, and the like. When a user opens a resource from the workspace through user interface 123, app recommender 126 determines an application with which to open the resource. In some embodiments, one or more recommended applications for a given resource are displayed to the user via user interface 123, and the user can select an application with which to open the given resource.

It is noted that in alternative embodiments workspace engine 122 is implemented as a separate component from virtual desktop client 128.

Connection server 130 generally comprises a computing device, such as a server computer or desktop computer, that performs operations related to management of connections and files. In certain embodiments, connection server 130 establishes and manages connections between clients, such as virtual desktop client 128, and agents, such as a virtual desktop agent of a virtual desktop 142. In general, connection server 130 operates by receiving login credentials for a remote desktop or virtual desktop from a client, verifying whether the login credentials are accurate, and allowing the connection if the credentials are valid. Connection server 130 includes remote filer 132, which generally handles persisting and maintaining the status of remote files, such as files located on remote desktops (virtual desktops 142). Remote files handled by remote filer 132 can include, for example, files in remote folders identified by a user of the workspace via user interface 123. When a remote file on a remote desktop 142 is changed (e.g., added, moved, removed, modified, or renamed), file change information will be sent from remote desktop 142 to remote filer 132, which persists the file change and then pushes the file change information to workspace engine 122.

Host 140 generally represents a physical computing device, such as a server, that runs one or more virtual desktops/applications 142. For example, virtual desktops/applications 142 include one or more virtual computing instances running on a hypervisor on host 140. Virtualization and hypervisors are described in more detail below with respect to FIG. 2.

Cloud drives 150 generally represent a plurality of physical and/or virtual computing devices on which resources can be located and accessed via network 110. For example, workspace engine 122 can display graphical representations of various resources located on cloud drives 150, and a user of client device 120 can access and manage the resources centrally from the workspace as described herein. In some embodiments, one or more of cloud drives 150 represent cloud storage devices that host cloud storage services.

In certain embodiments, workspace engine 122 allows data to be shared between different applications. For example, a user of client device 120 identifies a number of applications that are "managed applications" for workspace engine 122 and a number of files that are "managed files" for workspace engine 122. Managed applications are applications that can be accessed and executed within the workspace. Managed files are files that can be accessed and managed within the workspace and that are directly accessible to managed applications. Workspace engine 122 facilitates interactions between managed applications and access to managed files by managed applications. For example, when a managed application is opened within the workspace, workspace engine 122 ensures that any managed files accessible to the managed application, even if the managed files are not local to the managed application, are displayed within the file system of the managed application similarly to how workspace engine 122 displays graphical representations of files within the workspace. When the user opens a file from the workspace, in some examples, workspace engine 122 uses a default managed application to open the file. When a managed application running within the workspace saves a file, workspace engine 122 allows the managed application to save the file either locally to the managed application or remotely, such as on a cloud or virtual drive as a managed file.

In some embodiments, when a user clicks on a graphical representation of a given file within the workspace, a pop-up menu will provide the user with a list of file operations, such as "open with", "share", "copy", "move", and "collaborate". If the user selects "open with", in some embodiments the user is presented with a list of managed applications that can potentially be used to open the file. For instance, if the user selects "share", the user is presented with a list of managed applications with which the user can share the file. In one example a first virtual desktop 142 is a managed application, and the user wishes to share a managed file from a second virtual desktop 142 with the first virtual desktop 142. As such, workspace engine 122 makes the file accessible to the first virtual desktop 142 based on the user's input.

In certain embodiments, if the user selects "copy" or "move", the user is be presented with a list of directories associated with managed files, and the user is able to select a remote directory to which to move or copy the file. In some embodiments, If the user selects "collaborate", the user is presented with a list of managed applications with which to open the file and collaborate with one or more other users, and then the user is prompted to identify the one or more other users with which to collaborate. During collaboration, the user and the one or more other users are able to simultaneously view and interact with the file in a given application from different client devices.

It is noted that, in some embodiments, client device 120 is a mobile device, and workspace engine 122 is a mobile application.

It is further noted that, while FIG. 1 depicts virtual desktops 142, techniques described herein may alternatively be implemented with other types of computing components, such as remote desktop connections to physical computing devices.

Techniques described herein constitute an improvement to conventional techniques for accessing and managing resources maintained at a plurality of computing components, as they allow for efficient interconnectivity and centralized use of these resources. For example, embodiments of the present disclosure allow for accessing and interacting with resources on a virtual desktop without requiring a user to manually connect to the virtual desktop and navigate to the resources. Furthermore, techniques described herein allow for multiple users to efficiently collaborate with one or more resources. Additionally, embodiments of the present disclosure allow workflows to be defined for automated control of processes involving resources.

Figure 2:
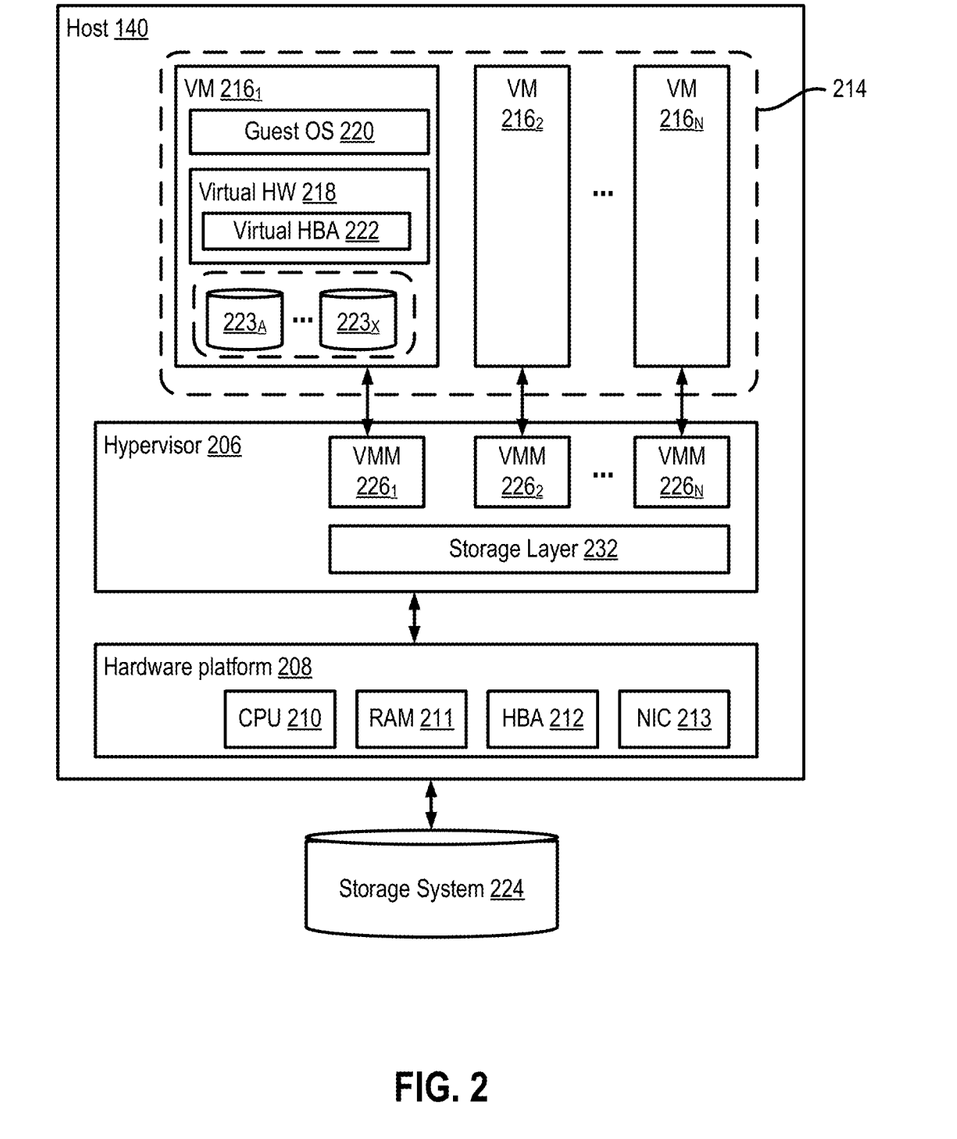
FIG. 2 illustrates additional components of a computing environment in which embodiments of the present disclosure may be implemented.

FIG. 2 illustrates additional components of a computing environment in which embodiments of the present disclosure may be implemented.

Host 140 generally represents host 140 of FIG. 1. One or more of VMs 216 of FIG. 2, in some embodiments, represent virtual desktops 142 of FIG. 1. VMs 216 run on top of a software interface layer, referred to as a hypervisor 206, that enables sharing of the hardware resources of host 140 by VMs 216. One example of hypervisor 206 is a VMware® ESXi hypervisor provided as part of the VMWare® vSphere solution made commercially available from VMware®, Inc. In some embodiments, storage system 224 is implemented as software-defined storage such as VMware® Virtual SAN that clusters together server-attached hard disks and/or solid state drives (HDDs and/or SSDs), to create a flash-optimized, highly resilient shared data store designed for virtual environments.

Host 140 generally comprises a general purpose computer system having one or more virtual machines accessing data stored on a storage system 224 communicatively connected to host 140. In certain embodiments, host 140 is constructed on a conventional, typically server-class, hardware platform 208. Hardware platform 208 of host 140 generally includes conventional physical components of a computing device, such as a processor (CPU) 210, a memory 211, a disk interface 212, and a network interface card (NIC) 213. Processor 210 is configured to execute instructions, for example, executable instructions that perform one or more operations described herein and may be stored in memory 211. Memory 211 and storage system 224 are devices allowing information, such as executable instructions, virtual disks, configurations, and other data, to be stored and retrieved. In certain embodiments, memory 211 includes one or more random access memory (RAM) modules. Storage system 224 generally includes one or more locally attached storage devices, for example, one or more hard disks, flash memory modules, solid state disks, and optical disks. In some embodiments, storage system 224 includes a shared storage system having one or more storage arrays of any type such as a network-attached storage (NAS) or a block-based device over a storage area network (SAN). Disk interface 212, such as a host bus adapter (HBA), enables host 140 to communicate with a storage device, such as storage system 224, to store virtual disks 223A-x that are accessed by VMs 216. Network interface 213 enables host 140 to communicate with another device via a communication medium, such as a communication network (e.g., network 110 of FIG. 1). An example of network interface 213 is a network adapter, also referred to as a Network Interface Card (NIC). In certain embodiments, client device 120, connection server 130, and/or cloud drives 150 of FIG. 1 have a hardware platform similar to hardware platform 208.

While storage system 224 is typically made up of a plurality of disks, other forms of storage, such as solid-state non-volatile storage devices, may be used, and the use of the term, "disk" herein, should therefore not be construed as limited only to rotating disk storage media, but may also be construed to encompass solid state disks, or "SSDs." In some embodiments, storage system 224 is comprised of high-density non-volatile memory. Furthermore, while storage system 224 is depicted as a separate, external component to host 140, storage system 224 may alternatively be internal to host 140, for example, a local storage device or locally attached storage.

As shown in FIG. 2, a hypervisor 206 is installed on top of hardware platform 208 and supports a virtual machine execution space 214 within which multiple virtual machines (VMs) $216_1$-$216_N$ are instantiated and executed. In certain embodiments, each such virtual machine $216_1$-$216_N$ implements a virtual hardware platform that supports the installation of a guest operating system (OS) which is capable of executing one or more applications (not shown). Examples of a guest OS include any of the well-known commodity operating systems, such as Microsoft Windows, Linux, and the like. Hypervisor 206 includes a storage layer 232 configured to manage storage space persistently for VMs 216 via VMM layers $226_1$ to $226_N$. In some embodiments hypervisor 206 runs on top of a host operating system of host 140, while in other embodiments hypervisor 206 runs directly on hardware components, such as hardware platform 208, of host 140.

As used herein, a "virtual desktop" is a desktop running on a VM (e.g., one of VMs 216) that is displayed remotely on a client device (e.g., client device 120 of FIG. 1) as though the virtualized desktop were running on the client device. By opening an interface (e.g., a virtual desktop client application or a user interface of a workspace), a user of the client device accesses, through network 110 of FIG. 1, a remote desktop running in host 140, from any location, using the client device. Frames of the remote desktop running on the VM are transmitted to the client device at a certain frame rate in format such as bitmap, raster graphic image, or vector graphics image. In certain embodiments, frames are transmitted using a desktop delivery protocol such as VMware® Blast™, or Microsoft® Remote Desktop Protocol (RDP)™. In some embodiments, workflow engine 122 of FIG. 1 allows the user of the client device to specify a protocol for use in delivering the remote desktop for display within user interface 123 of FIG. 1.

After transmission, the frames are displayed on the client device for interaction by the user within user interface 123 of FIG. 1. The client device sends user inputs to the VM for processing, taking processing load off of the client device. Such centralized and automated management of virtualized desktops provides increased control and cost savings. In certain embodiments, the client device runs VMware® View™, or a special purpose thin client such as those available from Dell, HP, NEC, Sun Microsystems, Wyse, and others, such as within user interface 123 of FIG. 1.

It should be recognized that the various terms, layers and categorizations used to describe the virtualization components in FIG. 2 may be referred to differently without departing from their functionality or the spirit or scope of the invention. For example, VMMs 226 may be considered separate virtualization components between VMs 216 and hypervisor 206 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as a virtual hardware platform is merged with and into VMM 226 such that virtual host bus adapter 212 is removed from FIG. 2 (i.e., since its functionality is effectuated by a host bus adapter emulator within VMM 226).

Figure 3A:
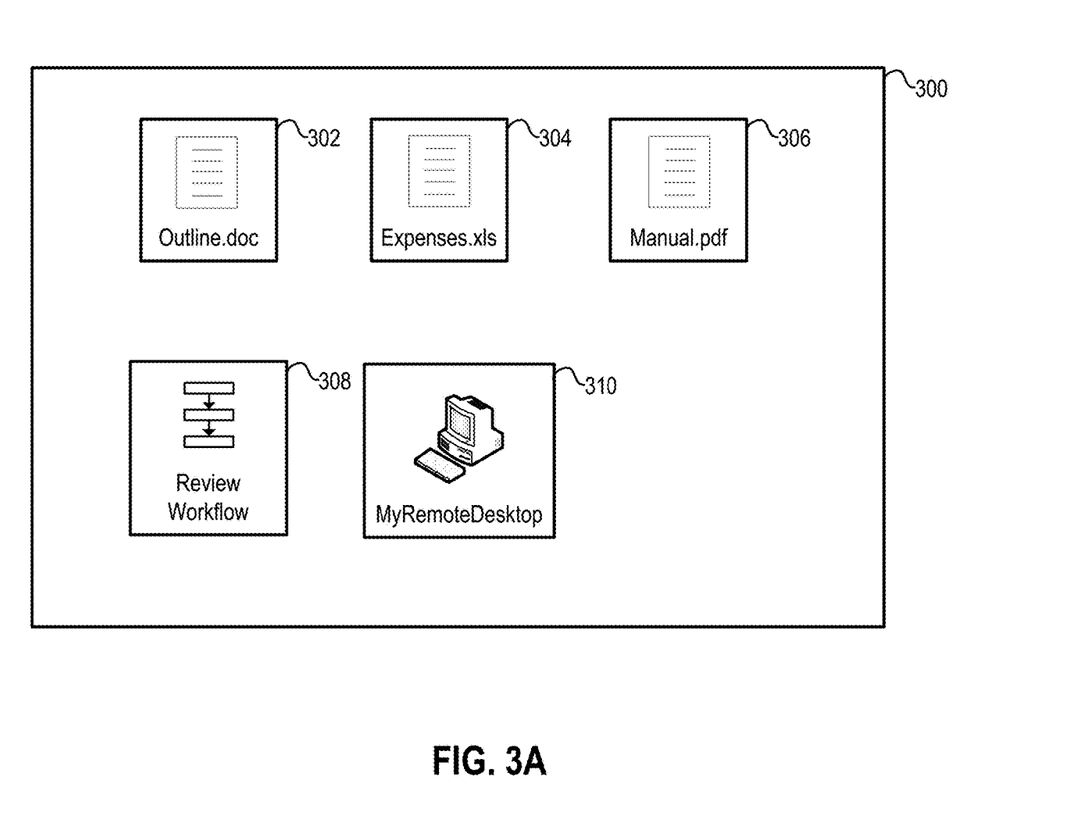
FIG. 3A illustrates an example user interface for management of resources, according to embodiments of the present disclosure.

FIG. 3A depicts an example user interface 300 for management of resources, according to embodiments of the present disclosure. In some examples, user interface 300 is representative of user interface 123 of FIG. 1, and displays a workspace as described herein.

User interface 300 includes graphical representations 302, 304, 306, 308, and 310, which generally represent remote resources. Graphical representations 302, 304, and 306 generally represent documents that are managed files accessible from the workspace. In one example, the user has provided input identifying a location (e.g., a path) on a remote desktop (e.g., "MyRemoteDesktop" shown in graphical representation 310) and three resource types (e.g., the file types "doc", "xls", and "pdf") for inclusion in the workspace, and workspace engine 122 of FIG. 1 has identified the resources "Outline.doc", "Expenses.xls", and "Manual.pdf" of the resource types at the location. As such, workspace engine 122 of FIG. 1 generated graphical representations 302, 304, and 306 for display in the workspace.

In some embodiments, the user is able to open, modify, move, print, collaborate, generate workflows, and perform other operations with respect to each of these resources via user interface 300 using graphical representations 302, 304, and 306, as described in more detail below with respect to FIG. 3B. In one example, if the user double-clicks on graphical representation 302, workspace engine 122 of FIG. 1 opens the resource "Outline.doc" within user interface 300, such as using a default application associated with the resource type ".doc" (e.g., a particular word processing application). For example, workspace engine 122 of FIG. 1 automatically connects to "MyRemoteDesktop" (e.g., using virtual desktop client 128 of FIG. 1), in some cases using stored credentials provided by the user (e.g., as part of a configuration process for the workspace wherein the user set up a connection to "MyRemoteDesktop"), and access the file "Outline.doc" at the location that was identified by the user at the time graphical representation 302 was added to the workspace. As such, the file is opened for viewing and/or modification within user interface 300 without requiring the user to manually connect to "MyRemoteDesktop", navigate to the file, and open it. In one example, workspace engine 122 retrieves the file "Outline.doc" from "MyRemoteDesktop", such as via virtual desktop client 124 and/or remote filer 132 of FIG. 1 and opens the file for viewing and/or modification using an application installed on client device 120 of FIG. 1. If the user modifies the file, workspace engine 122 may transfer the modified file back to "MyRemoteDesktop", such as via virtual desktop client 124 and/or remote filer 132 of FIG. 1.

Graphical representation 308 generally represents a workflow defined by the user for a document review. In one example, the user created a workflow defining a review process for "Manual.pdf", represented by graphical representation 306, which includes a plurality of steps related to review of "Manual.pdf" by one or more users. In a certain example, the review workflow includes a series of users that are to review "Manual.pdf" before it is approved. In other embodiments, the review workflow is not specific to any given resource, and may be used with any resource. In certain embodiments the user drags and drops one of graphical representations 302, 304, or 306 onto graphical representation 308 in order to initiate the review workflow with a particular resource.

When a user initiates the review workflow, such as by double-clicking on graphical representation 308, in some examples, workflow engine 125 of FIG. 1 automatically begins the workflow and advances through the stages of the workflow. In an example, "Manual.pdf" is sent via email to a first user for review and, once the first user has approved, it is sent to a second user for review. If the first user provides comments or revisions, workflow engine 125 of FIG. 1 sends "Manual.pdf" back to the user who initiated the workflow to respond to the first user's feedback and then back to the first user for approval before sending it to the second user. Once all steps in the review workflow have been completed, the resource is approved. In some embodiments, each user involved in the workflow is notified when each step is complete and/or when the workflow has finished.

Graphical representation 310 represents a remote desktop entitled MyRemoteDesktop. In one example, MyRemoteDesktop is a virtual desktop 142 of FIG. 1 and/or a VM 216 of FIG. 2. In certain embodiments, the user provided input identifying connection information for MyRemoteDesktop, such as a location (e.g., a network path to the location on host 140 where MyRemoteDesktop is stored) and credentials for accessing MyRemoteDesktop. Workspace engine 122 of FIG. 1 generated graphical representation 310 based on the user's input. The user is able to access MyRemoteDesktop from within user interface 300, such as by selecting graphical representation 310, as described in more detail below with respect to FIG. 3C.

Figure 3B:
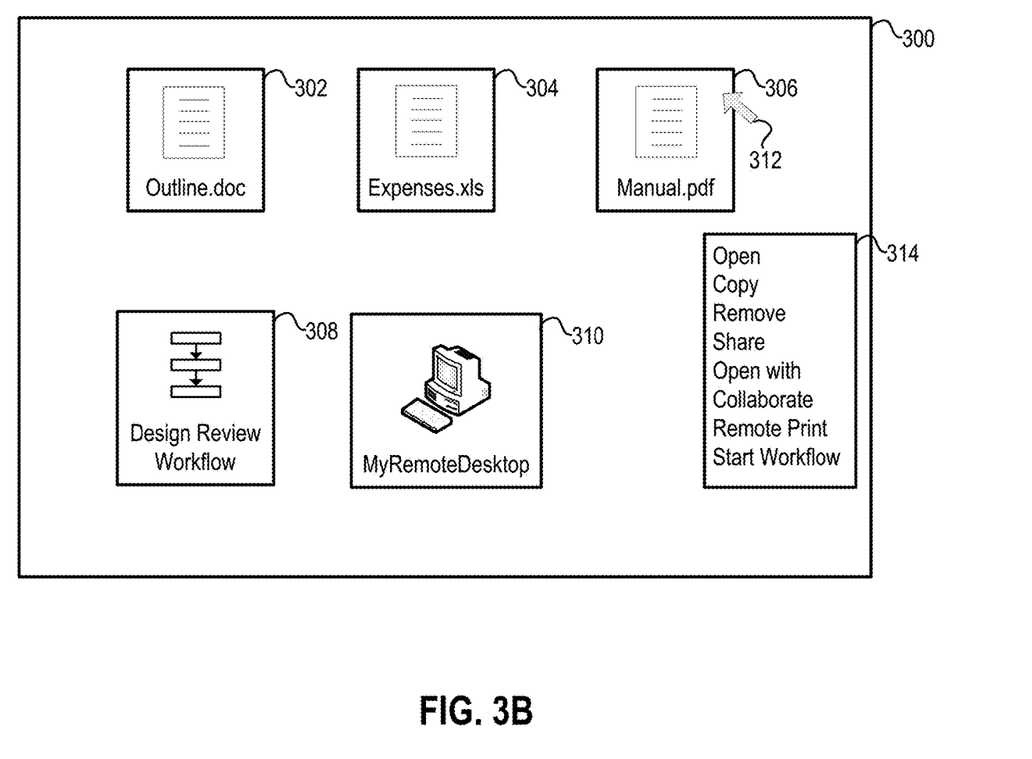
FIG. 3B illustrates another aspect of an example user interface for management of resources, according to embodiments of the present disclosure.

FIG. 3B illustrates another aspect of an example user interface 300 for management of resources, according to embodiments of the present disclosure.

In one example, the user uses cursor 312 to provide input to the workspace via user interface 300. In an example, the user clicks with cursor 312 on the top right corner of graphical representation 306 in order to open menu 314. Menu 314 is a pop-up menu that provides options for the user to select with respect to a given resource, such as "Manual.pdf" represented by graphical representation 306. Menu 314 includes an option to open a given resource, such as using a default application associated with a file type of the given resource. In one example, a default application is associated with the file type "pdf," and that default application is used to open "Manual.pdf" if the "open" option is selected from menu 314. Menu 314 also includes an option to copy a given resource. In an example, if the user selects the "copy" option from menu 314, "Manual.pdf" can be copied to another remote location. Menu 314 also includes an option to remove a given resource. In an example, if the user selects the "remove" option from menu 314, "Manual.pdf" is removed from the workspace, such as by workspace engine 122 of FIG. 1, and no longer appears in user interface 300.

Menu 314 also includes an option to share a given resource. In one example, if the user selects "share" from menu 314, the user is presented with a list of managed applications with which the user can share the file. Menu 314 also includes an "open with" option, which allows the user to identify a managed application with which to open the given resource. Menu 314 also includes a "collaborate with" option. In an example, the "collaborate with" option allows the user to identify a managed application with which to open the given resource, and then the user is able to identify one or more users with which to collaborate using the given resource via the identified managed application.

Menu 314 also includes a "remote print" option, which allows the user to print the given resource on a remote printer. In some embodiments, the user has set up connections to one or remote printers through interactions with workspace engine 122 of FIG. 1. Menu 314 also includes a "start workflow" option, which allows the user to start a workflow using the given resource. For example, the user may select "start workflow" in order to define a review workflow for "Manual.pdf" that includes a plurality of steps related to review of "Manual.pdf" by one or more users.

Figure 3C:
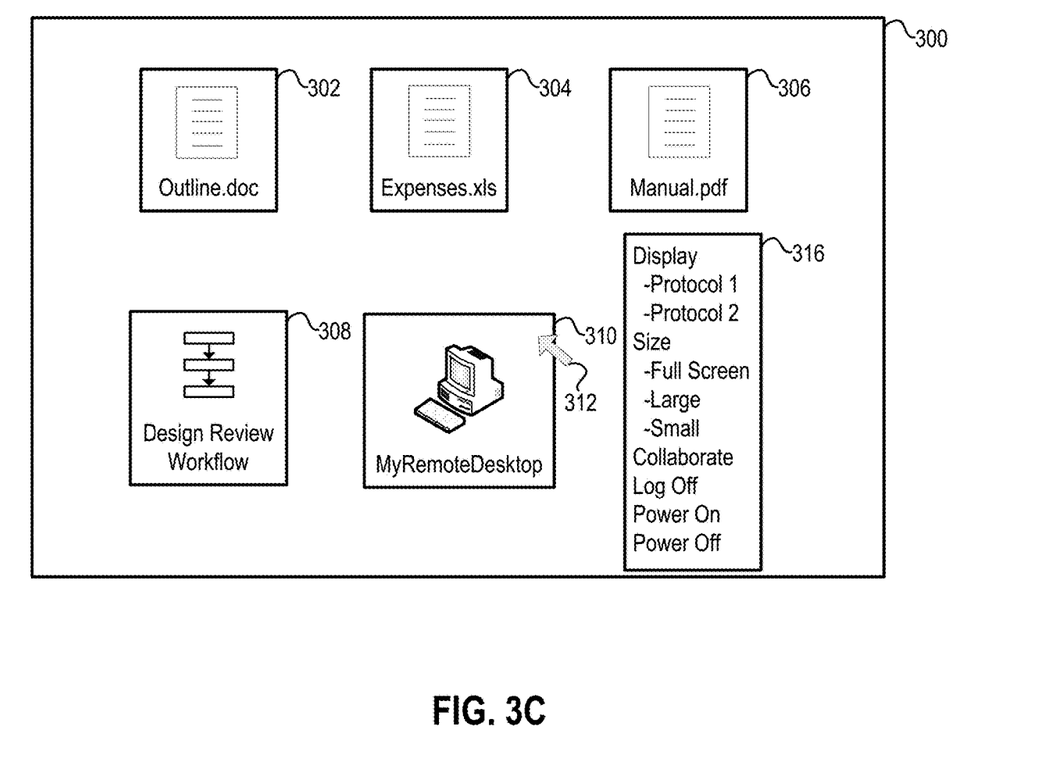
FIG. 3C illustrates another aspect of an example user interface for management of resources, according to embodiments of the present disclosure.

FIG. 3C illustrates another aspect of an example user interface 300 for management of resources, according to embodiments of the present disclosure.

In one example, the user uses cursor 312 to provide input to the workspace via user interface 300. In an example, the user clicks with cursor 312 on the top right corner of graphical representation 310 in order to open menu 316. Menu 316 is a pop-up menu that provides options for the user to select with respect to a given resource, such as MyRemoteDesktop represented by graphical representation 310. Menu 316 includes an option to display MyRemoteDesktop, and also provides options for different protocols (e.g., protocol 1 and protocol 2) for use in displaying MyRemoteDesktop. In some embodiments, protocol 1 and protocol 2 represent protocols such as VMware® Blast™, Microsoft® Remote Desktop Protocol (RDP)™, and the like.

Menu 316 further includes different size options for displaying MyRemoteDesktop, including full screen, large, or small. These are only included as examples, and other size options can be included, such as custom size options. Menu 316 further includes an option to collaborate. In an example, if the user selects the collaborate option, the user is prompted to provide information about one or more other users with which to collaborate using MyRemoteDesktop, such as by providing user identifiers, email addresses, or the like. In one example, the user provides a user identifier of a given user, and a collaboration session is initiated between the user and the given user. In certain embodiments MyRemoteDesktop is launched within user interface 300 as well as within a user interface associated with the given user and both the user and the given user is able to interact with MyRemoteDesktop simultaneously. It is noted that, in some embodiments, users is able to collaborate using a plurality of resources together.

Menu 316 further includes an option to log off, which causes the user to log off of MyRemoteDesktop, as well as to power on or power off, which launches or exits MyRemoteDesktop.

It is noted that user interface 300 in FIGS. 3A, 3B, and 3C is only included as an example, and other types of user interfaces and/or user interface components may be employed for techniques described herein.

Figure 4:
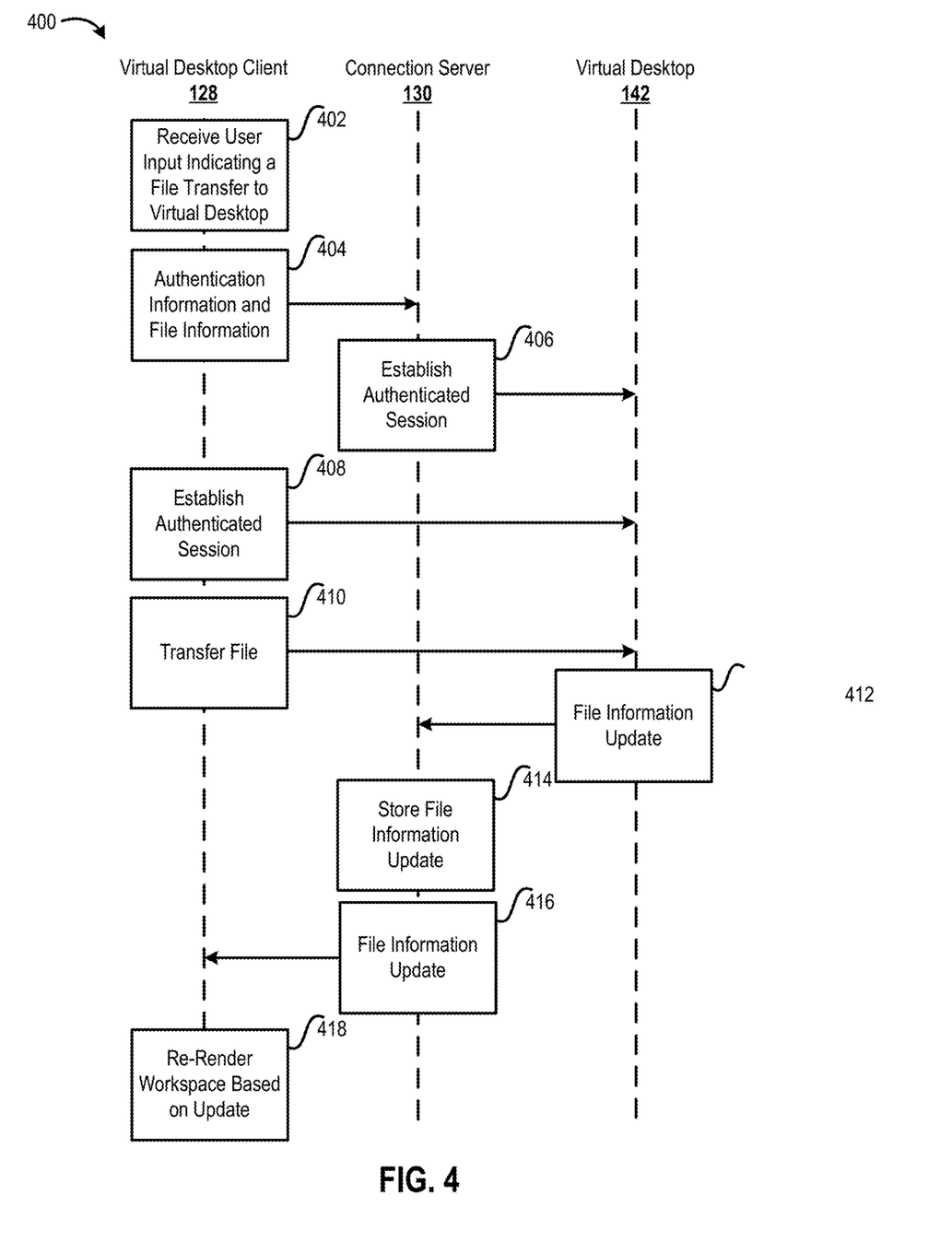
FIG. 4 illustrates an example exchange of messages between components related to management of resources.

FIG. 4 illustrates an example 400 of an exchange of messages between components related to management of resources. Example 400 includes workspace engine 122, virtual desktop client 124, remote filer 132, and virtual desktop 142 of FIG. 1. Example 400 represents a process for efficiently transferring a file from one location to another based on input from a user to a workspace.

At 402, user input indicating a file transfer to a virtual desktop is received by virtual desktop client 128, such as via workspace engine 122 of FIG. 1. For example, the user may provide drag and drop input by dragging a file from a folder (e.g., a folder associated with a cloud drive) onto a graphical representation of a virtual desktop, such as graphical representation 310 of FIGS. 3A, 3B, and 3C.

At 404, authentication information and file information are both provided by virtual desktop client 124 to connection server 130 based on the user input received at 402. In one example, the authentication information includes credentials of the user for accessing the virtual desktop that were provided by the user in advance, such as when the user added the virtual desktop to the workspace. The file information can, for example, include the filename and/or location of the file identified by the user at 402.

At 406 and 408, connection server 130 and virtual desktop client 124 both establish authenticated sessions with virtual desktop 142. In some examples, connection server 130 and virtual desktop client 124 each use the authentication information received at 404 to establish an authenticated session with virtual desktop 142.

At 410, virtual desktop client 124 transfers the file to virtual desktop 142. In some examples, virtual desktop client 124 copies the file identified by the user at 402 to the virtual desktop using virtual desktop protocol (VDP) service using the authenticated session established at 408.

At 412, virtual desktop 142 provides a file information update to connection server 130. In certain embodiments, the file information update includes a location of the file on virtual desktop 142 after it is transferred at 410.

At 414, connection server 130 stores the file information update. In one example, connection server 130 stores information about various files managed by workspace engine 122 of FIG. 1, and keeps the information current as file information updates are received from remote locations, such as virtual desktop 142.

At 416, connection server 130 sends the file information update to virtual desktop client 128. At 418, virtual desktop client 128 re-renders the workspace based on the file information update. In certain embodiments, virtual desktop client 128 generates a graphical representation of the file that was transferred to virtual desktop 142 at 410, and displays the graphical representation of the file in the workspace. The user is enabled to access and interact with the file from the workspace via the graphical representation as described herein.

As changes are made to the file, file information updates will continually be sent from virtual desktop 142 to connection server 130, which will persist the file information updates (e.g., by updating stored information) and send the file information updates to virtual desktop client 128 so that the workspace can be updated accordingly.

Figure 5:
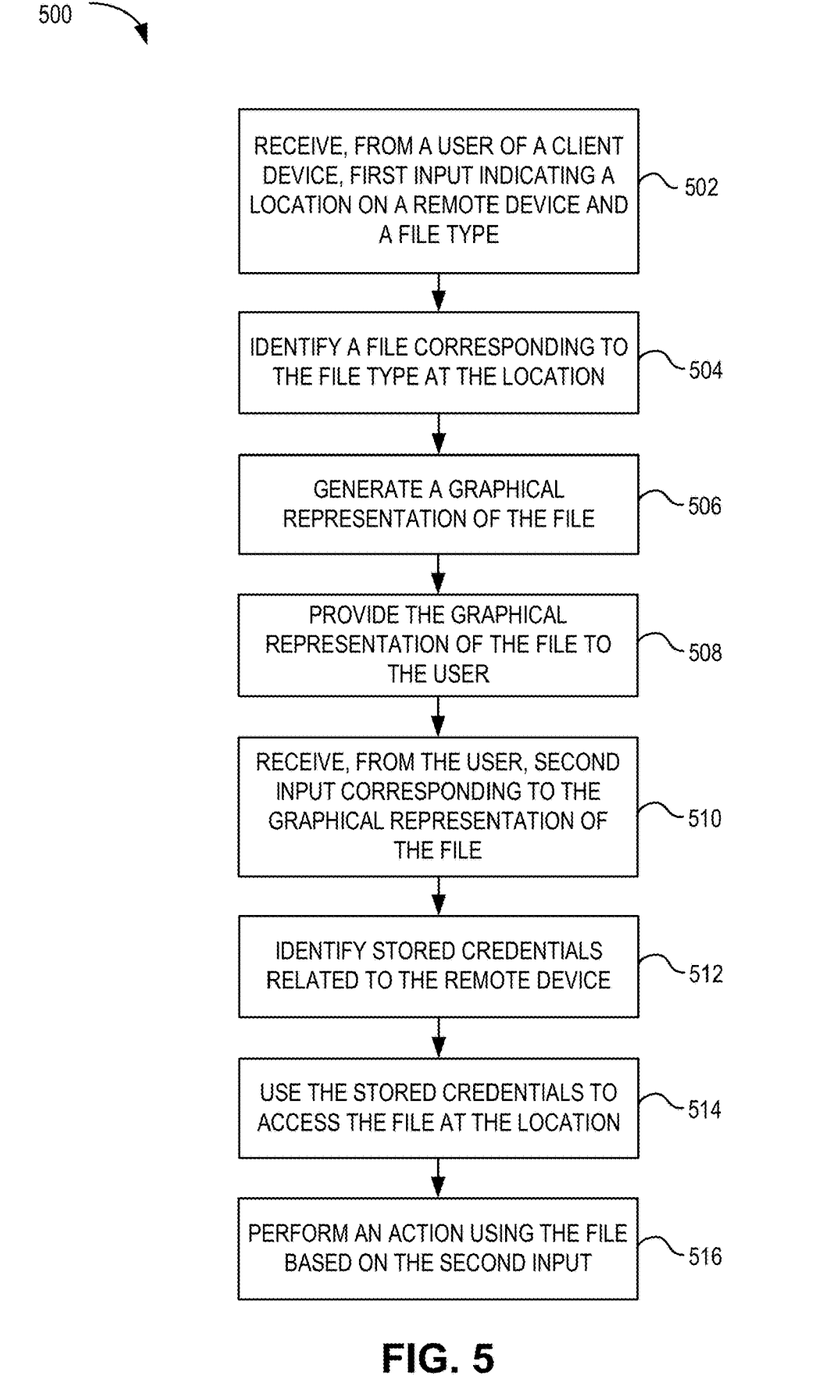
FIG. 5 illustrates example operations related to management of resources, according to embodiments of the present disclosure.

FIG. 5 illustrates example operations 500 related to management of resources, according to embodiments of the present disclosure. For example, operations 500 may be performed by workspace engine 122 of FIG. 1.

At step 502, first input indicating a location on a remote device and a file type is received from a user of a client device. In some examples, workspace engine 122 of FIG. 1 receives input from the user identifying a path on a virtual desktop and a file type indicating that the user wants to add all files of the file type in the path to the workspace.

At step 504, a file corresponding to the file type is identified at the location. In certain embodiments workspace engine 122 of FIG. 1 establishes a session with the virtual desktop using virtual desktop client 128 of FIG. 1 and identifies a file of the file type at the path provided by the user at step 502. In some embodiments, a plurality of files of the file type are identified.

At step 506, a graphical representation of the file is generated. In an example, workspace engine 122 of FIG. 1 generates the graphical representation including an icon corresponding to the file type and a name of the file for inclusion in the workspace.

At step 508, the graphical representation of the file is provided to the user. In one example, workspace engine 122 of FIG. 1 displays the graphical representation within the workspace, which the user views via a user interface on a display associated with the client device.

At step 510, second input corresponding to the graphical representation of the file is received from the user. In certain embodiments, the user clicks on the graphical representation and selects an option from a pop-up menu, such as to open the file using a given application (e.g., on a virtual desktop) or using a default application. In other embodiments, the user selects an option to create a workflow involving the file, collaborate with one or more additional users using the file, rename the file, copy the file, move the file, share the file, or perform another action with respect to the file. In another embodiment, the user provides drag and drop input moving the file to a different remote location.

At step 512, stored credentials related to the remote device are identified. In certain embodiments, the stored credentials were provided by the user, such as when the user first added a connection to the remote device from the workspace. In an example, the remote device is a virtual desktop, and the stored credentials include a username and/or password for logging into the virtual desktop. In an example, the user indicated at step 510 to open a file stored on a virtual desktop using an application running on the virtual desktop, and the stored credentials correspond to the virtual desktop.

At step 514, the stored credentials are used to access the file at the location. In one example, workspace engine 122 of FIG. 1 initiates a virtual desktop session by logging into a virtual desktop using the stored credentials and providing a remote interface to the virtual desktop session on the client device, and accesses the file on the virtual desktop. In some embodiments, workspace engine 122 of FIG. 1 logs into the virtual desktop and accesses the file via virtual desktop client 128 of FIG. 1.

At step 516, an action is performed using the file based on the second input. In one example, workspace engine 122 of FIG. 1 performs the action identified by the user in the second input at step 510 using the file. The action may be, for example, opening the file (e.g., using a default application, an application identified by the user, an application determined based on historical data, or an application that is otherwise associated with the file), moving the file, copying the file, removing the file, sharing the file, printing the file, creating a workflow involving the file, initiating a collaboration session with one or more collaborating users (e.g., other users with which the user wishes to collaborate) with the file, or another action. In one example, workspace engine 122 of FIG. 1 opens the file using a given application on the virtual desktop, and the user is able to interact with the file without manually connecting to the virtual desktop and/or performing additional steps to access the file. In other embodiments, the second input indicates to open the file using an application on a virtual desktop that is different than the location at which the file is stored. As such, the action comprises transferring the file to the virtual desktop and opening the file within the application on the virtual desktop without requiring the user to manually transfer the file to the virtual desktop.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in a non-transitory computer-readable medium of the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The computer readable media may be non-transitory. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method, comprising:
   receiving, from a user of a client device, configuration information comprising credentials for a virtual desktop;
   receiving, from the user of the client device, first input indicating:
      a location on a remote device; and
      a file type, wherein the first input indicates that all existing files of the file type at the location on the remote device are to be included in a workspace;
   identifying a first file corresponding to the file type at the location;
   providing a first graphical representation of the first file and a second graphical representation of a second file to the user within the workspace, wherein the first graphical representation of the first file and the second graphical representation of the second file are selectable within the workspace;
   receiving, from the user, second input;
   when the second input corresponds to the first graphical representation of the first file and indicates to open the first file on the virtual desktop, wherein the virtual desktop runs on a different device than the client device and the remote device:
      identifying, in response to the second input, the credentials for the virtual desktop;
      initiating, in response to the second input, a virtual desktop session of the virtual desktop using the credentials;
      providing, in response to the second input, a remote interface to the virtual desktop session on the client device;
      transferring, in response to the second input and without further input from the user, the first file over a network from the location on the remote device to a storage location that is local to the virtual desktop;
      launching, in response to the second input, a first application within the virtual desktop session;
      opening, in response to the second input, the first file within the first application;
      determining that changes have been made to the first file within the first application; and
      tracking and persisting, automatically, the changes made to the first file over the network from the storage location that is local to the virtual desktop back to the location on the remote device; and
   when the second input corresponds to the second graphical representation of the second file, wherein the second file is associated with a second application within the virtual desktop:
      identifying, in response to the second input, the credentials for the virtual desktop;
      initiating, in response to the second input, a virtual desktop session of the virtual desktop using the credentials;
      providing, in response to the second input, a remote interface to the virtual desktop session on the client device;
      launching, in response to the second input, the second application within the virtual desktop session; and
      opening, in response to the second input, the second file within the second application.

2. The method of claim 1, wherein receiving, from the user, the second input corresponding to the first graphical representation of the first file comprises:
   providing the user with a plurality of options related to the first file; and
   receiving, from the user, a selection of an option of the plurality of options.

3. The method of claim 1, wherein the first application is associated with the first file based on one of:
   the second input; or
   a stored association between the file type and the first application.

4. The method of claim 1, further comprising:
   prompting the user to define one or more steps of a workflow involving the first file; and
   storing the workflow in association with the first file.

5. The method of claim 1, further comprising:
   sending an invitation to a collaborating user regarding a collaboration session for the first file;
   determining that the collaborating user has accepted the invitation; and
   initiating the collaboration session for the first file between the user and the collaborating user.

6. The method of claim 1, wherein the second input comprises a selection of one or more of: a window size; or a protocol.

7. The method of claim 1, wherein the second input corresponds to the first graphical representation of the first file, and wherein the method further comprises:
   ending the virtual desktop session;
   receiving, from the user, after the ending of the virtual desktop session, third input corresponding to the second graphical representation of the second file;
   identifying, in response to the third input, the credentials for the virtual desktop;
   initiating, in response to the third input, a second virtual desktop session of the virtual desktop using the credentials;
   providing, in response to the third input, a remote interface to the second virtual desktop session on the client device;
   launching, in response to the third input, the second application within the second virtual desktop session; and
   opening, in response to the third input, the second file within the second application.

8. The method of claim 1, wherein the remote device comprises a cloud or virtual drive managed by a managed application, and wherein the managed application is further accessible within the workspace.

9. The method of claim 8, wherein the configuration information further comprises credentials for the managed application.

10. A non-transitory computer readable medium comprising instructions to be executed in a computer system, wherein the instructions when executed in the computer system, cause the computer system to perform a method, the method comprising:
receiving, from a user of a client device, configuration information comprising credentials for a virtual desktop;
receiving, from the user of the client device, first input indicating:
a location on a remote device; and
a file type, wherein the first input indicates that all existing files of the file type at the location on the remote device are to be included in a workspace;
identifying a first file corresponding to the file type at the location;
providing a first graphical representation of the first file and a second graphical representation of a second file to the user within the workspace, wherein the first graphical representation of the first file and the second graphical representation of the second file are selectable within the workspace;
receiving, from the user, second input;
when the second input corresponds to the first graphical representation of the first file and indicates to open the first file on the virtual desktop, wherein the virtual desktop runs on a different device than the client device and the remote device:
identifying, in response to the second input, the credentials for the virtual desktop;
initiating, in response to the second input, a virtual desktop session of the virtual desktop using the credentials;
providing, in response to the second input, a remote interface to the virtual desktop session on the client device;
transferring, in response to the second input and without further input from the user, the first file over a network from the location on the remote device to a storage location that is local to the virtual desktop;
launching, in response to the second input, a first application within the virtual desktop session; and
opening, in response to the second input, the first file within the first application;
determining that changes have been made to the first file within the first application; and
tracking and persisting, automatically, the changes made to the first file over the network from the storage location that is local to the virtual desktop back to the location on the remote device; and
when the second input corresponds to the second graphical representation of the second file, wherein the second file is associated with a second application within the virtual desktop:
identifying, in response to the second input, the credentials for the virtual desktop;
initiating, in response to the second input, a virtual desktop session of the virtual desktop using the credentials;
providing, in response to the second input, a remote interface to the virtual desktop session on the client device;
launching, in response to the second input, the second application within the virtual desktop session; and
opening, in response to the second input, the second file within the second application.

11. The non-transitory computer readable medium of claim 10, wherein receiving, from the user, the second input corresponding to the first graphical representation of the first file comprises:
providing the user with a plurality of options related to the first file; and
receiving, from the user, a selection of an option of the plurality of options.

12. The non-transitory computer readable medium of claim 10, wherein the first application is associated with the first file based on one of:
the second input; or
a stored association between the file type and the first application.

13. The non-transitory computer readable medium of claim 10, wherein the method further comprises:
prompting the user to define one or more steps of a workflow involving the first file; and
storing the workflow in association with the first file.

14. The non-transitory computer readable medium of claim 10, wherein the method further comprises:
sending an invitation to a collaborating user regarding a collaboration session for the first file;
determining that the collaborating user has accepted the invitation; and
initiating the collaboration session for the first file between the user and the collaborating user.

15. The non-transitory computer readable medium of claim 10, wherein the second input comprises a selection of one or more of: a window size; or a protocol.

16. A computer system comprising one or more processors and a non-transitory computer-readable medium comprising instructions that, when executed, cause the one or more processors to perform a method, the method comprising:
receiving, from the user of the client device, configuration information comprising credentials for a virtual desktop;
receiving, from the user of the client device, first input indicating:
a location on a remote device; and
a file type, wherein the first input indicates that all existing files of the file type at the location on the remote device are to be included in a workspace;
identifying a first file corresponding to the file type at the location;
providing a first graphical representation of the first file and a second graphical representation of a second file to the user within the workspace, wherein the first graphical representation of the first file and the second graphical representation of the second file are selectable within the workspace;
receiving, from the user, second input;
when the second input corresponds to the first graphical representation of the first file and indicates to open the first file on the virtual desktop, wherein the virtual desktop runs on a different device than the client device and the remote device:
identifying, in response to the second input, the credentials for the virtual desktop;

initiating, in response to the second input, a virtual desktop session of the virtual desktop using the credentials;
providing, in response to the second input, a remote interface to the virtual desktop session on the client device;
transferring, in response to the second input and without further input from the user, the first file over a network from the location on the remote device to a storage location that is local to the virtual desktop;
launching, in response to the second input, a first application within the virtual desktop session; and
opening, in response to the second input, the first file within the first application;
determining that changes have been made to the first file within the first application; and
tracking and persisting, automatically, the changes made to the first file over the network from the storage location that is local to the virtual desktop back to the location on the remote device; and
when the second input corresponds to the second graphical representation of the second file, wherein the second file is associated with a second application within the virtual desktop:
identifying, in response to the second input, the credentials for the virtual desktop;
initiating, in response to the second input, a virtual desktop session of the virtual desktop using the credentials;
providing, in response to the second input, a remote interface to the virtual desktop session on the client device;
launching, in response to the second input, the second application within the virtual desktop session; and
opening, in response to the second input, the second file within the second application.

17. The computer system of claim 16, wherein receiving, from the user, the second input corresponding to the first graphical representation of the first file comprises:
providing the user with a plurality of options related to the first file; and
receiving, from the user, a selection of an option of the plurality of options.

18. The computer system of claim 16, wherein the first application is associated with the first file based on one of:
the second input; or
a stored association between the file type and the first application.

19. The computer system of claim 16, wherein the method further comprises:
prompting the user to define one or more steps of a workflow involving the first file; and
storing the workflow in association with the first file.

20. The computer system of claim 16, wherein the method further comprises:
sending an invitation to a collaborating user regarding a collaboration session for the first file;
determining that the collaborating user has accepted the invitation; and
initiating the collaboration session for the first file between the user and the collaborating user.

21. The computer system of claim 16, wherein the second input comprises a selection of one or more of: a window size; or a protocol.

* * * * *